United States Patent
Kim et al.

(10) Patent No.: US 11,624,808 B2
(45) Date of Patent: Apr. 11, 2023

(54) LIDAR SENSOR AND CONTROL METHOD THEREOF

(71) Applicant: Hyundai Mobis Co., Ltd., Seoul (KR)

(72) Inventors: Kyung Rin Kim, Yongin-si (KR); Sung Eun Jo, Yongin-si (KR); Won Gyum Kim, Yongin-si (KR); Young Shin Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 927 days.

(21) Appl. No.: 16/440,368

(22) Filed: Jun. 13, 2019

(65) Prior Publication Data
US 2019/0383912 A1  Dec. 19, 2019

(30) Foreign Application Priority Data
Jun. 14, 2018  (KR) .................. 10-2018-0067980

(51) Int. Cl.
| | |
|---|---|
| *G01S 7/481* | (2006.01) |
| *G02B 26/10* | (2006.01) |
| *G02B 26/08* | (2006.01) |
| *G01D 5/14* | (2006.01) |
| *G01S 17/10* | (2020.01) |

(52) U.S. Cl.
CPC ............ *G01S 7/4817* (2013.01); *G01D 5/145* (2013.01); *G02B 26/0816* (2013.01); *G02B 26/10* (2013.01); *G01S 17/10* (2013.01)

(58) Field of Classification Search
USPC .................. 356/4.01; 396/427; 348/143, 148
See application file for complete search history.

(56) References Cited

U.S. PATENT DOCUMENTS

| | | |
|---|---|---|
| 8,072,663 B2 | 12/2011 | O'Neill et al. |
| 10,451,740 B2 | 10/2019 | Pei et al. |
| 11,092,673 B2 | 8/2021 | Mlremadi |

(Continued)

FOREIGN PATENT DOCUMENTS

| | | |
|---|---|---|
| KR | 101449931 B1 | 10/2014 |
| KR | 10-2018-0003238 | 1/2018 |

(Continued)

OTHER PUBLICATIONS

Ex Parte Quayle Action dated Dec. 23, 2022, in U.S. Appl. No. 17/365,969.

(Continued)

*Primary Examiner* — Clayton E. LaBalle
*Assistant Examiner* — Warren K Fenwick
(74) *Attorney, Agent, or Firm* — H.C. Park & Associates, PLC (57) ABSTRACT

Provided is a lidar sensor having a driving motor of which the entire portion is covered under an inclined surface of a scan mirror having an opened bottom surface and an A-shaped cross-section. A rotating shaft of the driving motor may be connected to the bottom of a backing surface disposed under the inclined surface, a magnet may be disposed at the bottom of one or more of the backing surface and a support surface which are connected to the inclined surface of the scan mirror, and a hall sensor may be disposed at the bottom surface of the lidar sensor corresponding to the position where the magnet is disposed.

11 Claims, 6 Drawing Sheets

(56) References Cited

U.S. PATENT DOCUMENTS

| | | | |
|---|---|---|---|
| 2015/0090291 A1* | 4/2015 | Na | B60S 1/52 |
| | | | 134/6 |
| 2015/0277440 A1* | 10/2015 | Kimchi | G08G 5/0086 |
| | | | 701/26 |
| 2017/0115380 A1 | 4/2017 | Sapir | |
| 2017/0153319 A1* | 6/2017 | Villeneuve | H01S 3/08086 |
| 2017/0155225 A1* | 6/2017 | Villeneuve | H01S 3/06758 |
| 2020/0169270 A1 | 5/2020 | Nittoor | |
| 2022/0231479 A1* | 7/2022 | Raring | H01S 5/02469 |

FOREIGN PATENT DOCUMENTS

| | | | | |
|---|---|---|---|---|
| WO | 2008052365 A1 | 5/2008 | | |
| WO | WO-2008052365 A1 * | 5/2008 | | G01S 7/4817 |
| WO | 2016110442 A1 | 7/2016 | | |
| WO | 2017030638 A2 | 2/2017 | | |
| WO | 2017115380 A1 | 7/2017 | | |
| WO | 2017171140 A1 | 10/2017 | | |
| WO | 2017189185 A1 | 11/2017 | | |

OTHER PUBLICATIONS

Office Action dated Nov. 3, 2022 from the Korean Patent Office for Korean Patent Application No. 10-2018-0067980.

\* cited by examiner

FIG.1
<Prior Art>

<Horizontal Sensing Lidar>

LIDAR SENSOR AND CONTROL METHOD THEREOF

CROSS-REFERENCES TO RELATED APPLICATION

This application claims priority from and the benefit of Korean Patent Application No. 10-2018-0067980, filed on Jun. 14, 2018, which is hereby incorporated by reference for all purposes as if set forth herein.

BACKGROUND

Field

Exemplary embodiments relate to a lidar (light detection and ranging) sensor and a control method thereof, and more particularly, to a lidar sensor which can be reduced in size through a structure change of a driving unit including a rotating mirror (or scan mirror) and a driving motor to rotate the rotating mirror, and provide a rotation detection method of the rotating mirror, suitable for the changed structure of the driving unit, and a control method thereof.

Discussion of the Background

In general, a lidar sensor refers to a sensor that measures a distance using light, and senses an object. The lidar sensor has a similar principle to a radar.

The radar emits an electromagnetic wave to the outside and receives the electromagnetic wave to check a distance and direction, but the lidar sensor emits pulse laser. That is, since the lidar sensor uses short-wavelength laser, the lidar sensor can have high precision and resolution, and recognize an object in a three-dimensional manner.

Figure 1:
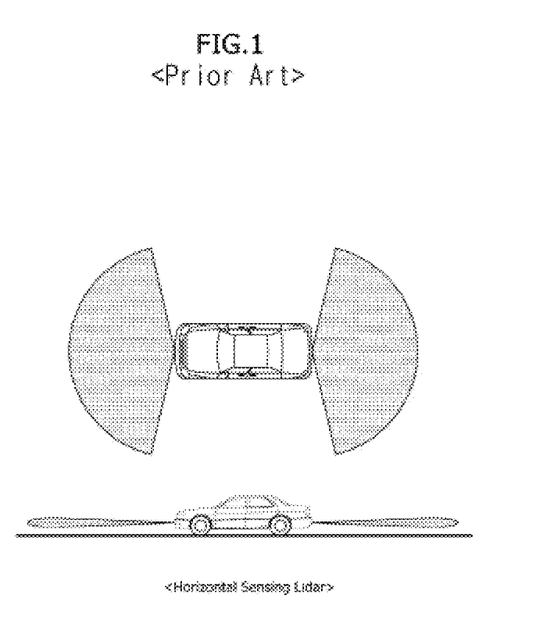
FIG. 1 illustrates the FOV (Field of View) of a lidar sensor mounted on a front/rear bumper of a vehicle.

For example, the lidar sensor may be mounted on a vehicle bumper, and sense an object or structure by monitoring an area at the front/rear of the vehicle. For reference, FIG. 1 illustrates the FOV (Field of View) of a lidar sensor mounted on the front/rear bumper of a vehicle.

The lidar sensor is usually mounted on the front bumper, and needs to be exposed to the outside. When the lidar sensor is installed in another structure such as a vehicle body or glass, the sensing performance of the sensor may be significantly degraded. Therefore, the lidar sensor is mounted so as to be exposed to the outside.

Figure 2:
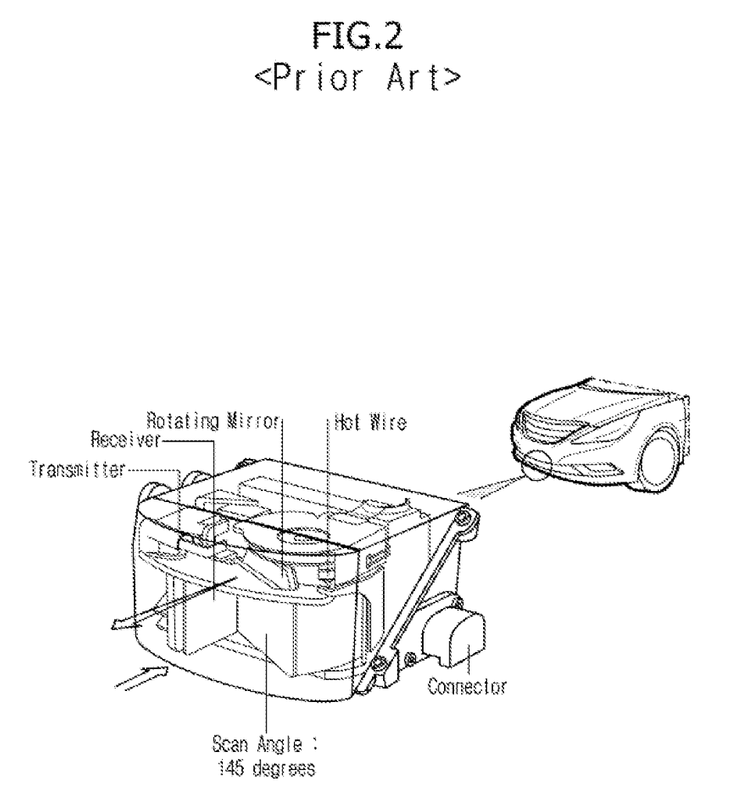
FIG. 2 illustrates a schematic configuration of an existing lidar sensor.

For reference, as illustrated in FIG. 2, the lidar sensor includes a transmitter to transmit laser, a receiver to receive reflected laser, and a driver to drive a mirror rotating motor. In addition, the lidar sensor includes a cover for protecting the sensor from foreign matters. The cover has a hot wire mounted thereon, and the hot wire serves to remove moisture or snow adhering to the surface of the cover.

However, since the existing lidar sensor has a much larger volume than other sensors attached to the vehicle, the volume of the lidar sensor may act as a burden when a plurality of lidar sensors are attached to an autonomous vehicle. Therefore, there is a demand for a technique capable of reducing the size of the lidar sensor.

The above information disclosed in this Background section is only for enhancement of understanding of the background of the invention and, therefore, it may contain information that does not constitute prior art.".

SUMMARY

Exemplary embodiments of the present invention provide a lidar sensor which can be reduced in size through a structure change of a driving unit including a rotating mirror (or scan mirror) and a driving motor to rotate the rotating mirror, and provide a rotation detection method of the rotating mirror, suitable for the changed structure of the driving unit, and a control method thereof.

Additional features of the invention will be set forth in the description which follows, and in part will be apparent from the description, or may be learned by practice of the invention.

In one embodiment, there is provided a lidar sensor having a driving motor of which the entire portion is covered under an inclined surface of a scan mirror having an opened bottom surface and an A-shaped cross-section. A rotating shaft of the driving motor may be connected to the bottom of a backing surface formed under the inclined surface, a magnet may be formed at the bottom of one or more of the backing surface and a support surface which are connected to the inclined surface of the scan mirror, and a hall sensor may be formed at the bottom surface of the lidar sensor, in response to the position where the magnet is formed.

The inclined surface of the scan mirror may be inclined with respect to the bottom surface of the lidar sensor, one side of the backing surface may be horizontally connected to the bottom of the inclined surface, the support surface may be connected to the top of the inclined surface and the other side of the backing surface at a designated angle, and the inclined surface, the backing surface and the support surface may form an A-shaped cross-section.

The backing surface may be formed at a height into which a height including the height of the main body of the driving motor and the length of the rotating shaft is reflected.

The backing surface may be formed at a height corresponding to a designated gap, such that the opened bottom surface of the scan mirror does not come in contact with the bottom surface of the lidar sensor having the driving motor attached thereto, when the driving motor is connected to the backing surface.

The lidar sensor may further include: a motor driving unit configured to rotate the scan mirror connected to the driving motor at a designated velocity; and a control unit configured to calculate an angle at which the driving motor or scan mirror is rotated, based on a rotational velocity and time from a reference position where the magnet is attached, and control an output of laser by distinguishing between a scan region and a non-scan region based on the calculated angle.

The control unit may scan an object ahead of the lidar sensor by outputting a laser scan signal, when the calculated angle corresponds to the scan region, and does not output the laser scan signal when the calculated angle corresponds to the non-scan region.

In another embodiment, a control method of a lidar sensor may include: detecting, by a control unit of the lidar sensor, a sensing signal indicating a reference position of a scan mirror; resetting, by the control unit, current position information to the reference position, when the sensing signal is detected; performing, by the control unit, laser scan while rotating the scan mirror at a designated velocity; calculating, by the control unit, an angle at which the scan mirror is rotated, based on a rotational velocity and time from the reference position; checking, by the control unit, whether the calculated angle has become a designated scan angle; continuously performing, by the control unit, the laser scan and the calculation of the scan angle, while rotating the scan mirror at a designated velocity, until the calculated angle becomes the designated scan angle; and performing, by the control unit, the laser scan in a scan region, and ending the laser scan in a non-scan region, based on the calculated scan angle.

The sensing signal may include a signal obtained when a hall sensor senses a magnet formed at one surface of the bottom of the scan mirror.

The reference position may be set to the start position of the scan region. When the sensing signal indicating the reference position is detected, the control unit may immediately start laser scan.

The reference position may be set to a position different from the start position of the scan region. When the sensing signal indicating the reference position is detected, the control unit may calculate the start position of the scan region from the reference position, and start laser scan at the calculated start position of the scan region.

The designated scan angle may include one or more of an angle corresponding to the start position of the scan region and an angle corresponding to the end position of the scan region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Hereinafter, exemplary embodiments of the present invention will be described in more detail with reference to the accompanying drawings.

Figure 3A:
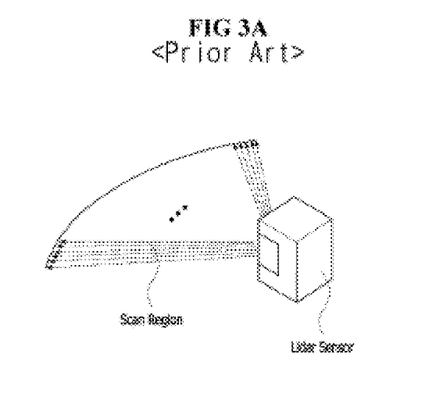
FIGS. 3A and 3B illustrate a basic operation of a conventional mirror-rotating lidar sensor.
Figure 3B:
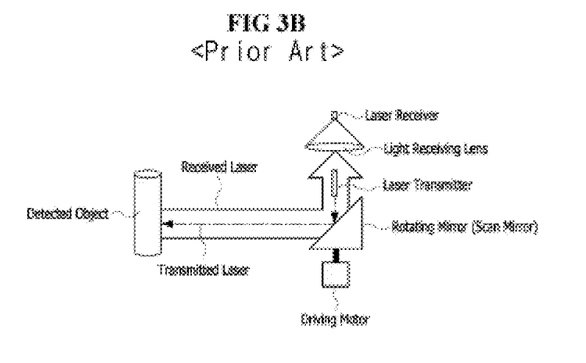

FIGS. 3A and 3B illustrate a basic operation of a conventional mirror-rotating lidar sensor.

As illustrated in FIG. 3A, the mirror-rotating lidar sensor may perform laser scan in a designated scan region (for example, at a scan angle of 145 degrees) ahead of the lidar sensor.

As illustrated in FIG. 3B, the mirror-rotating lidar sensor may include a rotating mirror (or scan mirror) coupled to the top of a driving motor, a laser transmitter at the top of the rotating mirror may vertically transmit laser (for example, pulse-type laser) toward an inclined surface of the rotating mirror, and the transmitted laser may be reflected by the inclined surface of the rotating mirror and outputted forward.

The outputted laser (or transmitted laser) may be reflected through a collision with an object (or detected object) ahead of the lidar sensor, and the laser reflected from the object (or received laser) may be reflected upward by the inclined surface of the rotating mirror (or scan mirror) and received by a laser receiver through a light receiving lens above the rotating mirror.

Figure 4A:
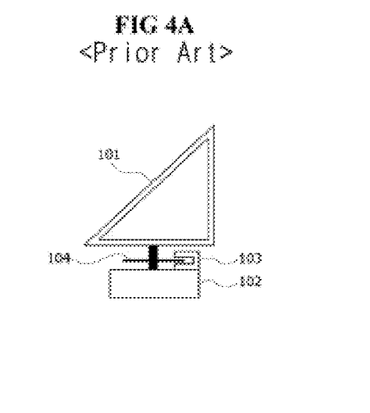
FIGS. 4A and 4B comparatively illustrate the structure of the conventional mirror-rotating lidar sensor and the structure of a mirror-rotating lidar sensor in accordance with an embodiment of the present invention.
Figure 4B:
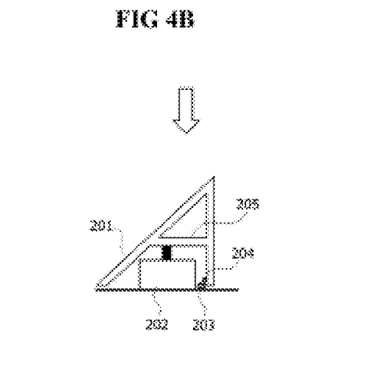

FIGS. 4A and 4B comparatively illustrate the structure of the conventional mirror-rotating lidar sensor and the structure of a mirror-rotating lidar sensor in accordance with an embodiment of the present invention.

FIG. 4A is a schematic cross-sectional view of the conventional mirror-rotating lidar sensor, and FIG. 4B is a schematic cross-sectional view of the mirror-rotating lidar sensor in accordance with the embodiment of the present invention.

Referring to FIG. 4A, the conventional mirror-rotating lidar sensor may include a rotating mirror (or scan mirror) 101 connected to the top of a driving motor 102. The rotating mirror may have a right triangle shape of which all sides are closed and one side is inclined.

An encoder 104 may be attached to a rotating shaft which connects the driving motor 102 and the rotating mirror 101, and an encoder detector 103 may be attached at an end of the encoder 104, and serve to detect a rotation of the encoder 104 using a hole formed in the encoder 104.

Therefore, since the conventional mirror-rotating lidar sensor needs to reflect all of the heights and volumes of the driving motor 102, the encoder 104, the encoder detector 103 and the rotating mirror 101, the entire height and volume of the lidar sensor are inevitably increased.

Referring to FIG. 4B, the mirror-rotating lidar sensor in accordance with the embodiment of the present invention may include a rotating mirror (or scan mirror) 201 having an opened bottom surface and an A-shaped cross-section, a driving motor 202 positioned in the rotating mirror 201 and covered by the rotating mirror 201, and a bar (or backing surface) 205 to which the top of a rotating shaft of the driving motor 202 is connected. The rotating mirror 201 may include one surface inclined with respect to the bottom surface of the lidar sensor, a backing surface having one side connected to the inclined surface in the horizontal direction so as to be connected to the rotating shaft of the driving motor, and a support surface connected to the top of the inclined surface and the other side of the backing surface and formed at a designated angle (for example, right angle). Therefore, the inclined surface, the backing surface and the support surface may form the A-shaped cross-section.

At this time, the rotating mirror 201 may not be limited to the A-shaped cross-sectional structure, but have a structure with only an inclined surface. In this structure with only an inclined surface, the driving motor 202 may be covered under the inclined surface.

More specifically, the driving motor 202 may be connected to the bar (or support surface) 205 formed therein through the opened bottom surface of the rotating mirror 201. The bar 205 may substantially function as a connection part for connecting the driving motor 202 to the inside of the rotating mirror 201.

The height at which the bar 205 is formed may be set to a larger or smaller height by reflecting the height of the driving motor 202 (i.e. a height including the height of the main body of the driving motor and the length of the rotating shaft).

However, when the driving motor 202 and the bar 205 are connected to each other, the opened bottom surface of the rotating mirror 201 may be slightly separated from the bottom surface of the lidar sensor, such that the opened bottom surface of the rotating mirror 201 does not come in contact with the bottom surface of the lidar sensor, i.e. the surface to which the driving motor 202 is attached.

Furthermore, a magnet 204 may be formed or attached to the bottom inside of the vertical surface of the rotating mirror 201, and a hall sensor 203 may be formed on the bottom surface of the lidar sensor, on which the driving motor is attached, in response to the position where the magnet 204 is formed or attached.

However, the positions where the magnet 204 and the hall sensor 203 are formed may be changed depending on the shape of the rotating mirror 201.

When the rotating mirror 201 has no vertical surface or has only an inclined surface, the magnet 204 may be formed at the bottom inside of the inclined surface or the bar 205. Thus, the position of the hall sensor 203 may also be changed.

Therefore, since the mirror-rotating lidar sensor in accordance with the embodiment of the present invention may reflect only the height of the rotating mirror 201, the entire volume of the lidar sensor can be reduced in comparison to the conventional lidar sensor.

In the present embodiment, a rotation of the rotating mirror 201 or the driving motor 202 may be detected through the magnet 204 and the hall sensor 203 in place of the encoder 104 and the encoder detector 103. Therefore, the mirror-rotating lidar sensor in accordance with the present embodiment needs to perform laser scan in a different manner from the conventional mirror-rotating lidar sensor.

The schematic configuration of the mirror-rotating lidar sensor in which the structure of the driving unit (i.e. the connection structure of the driving motor, the rotating mirror and the rotation sensor) is changed and an operating method of the mirror-rotating lidar sensor, suitable for the configuration, will be described with reference to FIGS. 5 and 6.

Figure 5:
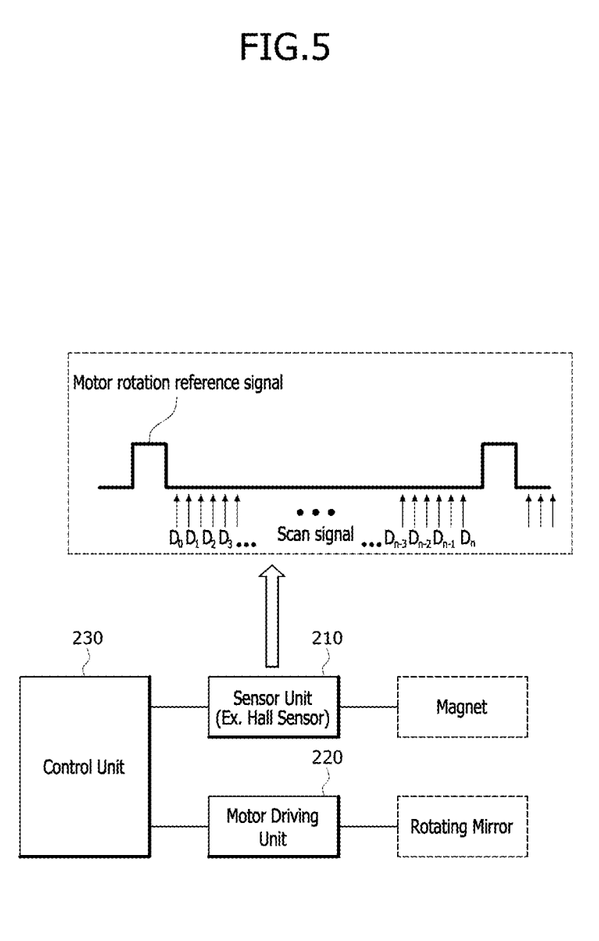
FIG. 5 illustrates the schematic configuration of the mirror-rotating lidar sensor in accordance with the embodiment of the present invention.

FIG. 5 illustrates the schematic configuration of the mirror-rotating lidar sensor in accordance with the embodiment of the present invention.

As illustrated in FIG. 5, the mirror-rotating lidar sensor in accordance with the embodiment of the present invention may include a sensor unit 210, a motor driving unit 220 and a control unit 230.

The sensor unit 210 may include a hall sensor 203 for sensing a magnet 204 attached to the rotating mirror (or scan mirror) 201.

In an embodiment, a plurality of magnets 204 may be attached depending on detection positions (for example, the start and end positions of a scan region).

The motor driving unit 220 may rotate the rotating mirror 201 connected to the driving motor 202 at a designated velocity, according to control of the control unit 230.

By rotating the driving motor 202 at a designated velocity, the control unit 230 may calculate the angle at which the driving motor 202 or the rotating mirror 201 is rotated, based on a rotational velocity and time from a reference position where the magnet is attached.

By calculating the angle at which the driving motor 202 or the rotating mirror 201 is rotated, the control unit 230 may distinguish between a scan region and a non-scan region, and determine whether to output laser. The scan region may indicate a region for scanning an object by outputting a laser scan signal to the front of the lidar sensor, and the non-scan region may indicate a region at the rear of the lidar sensor, where no laser scan signal is outputted.

Figure 6:
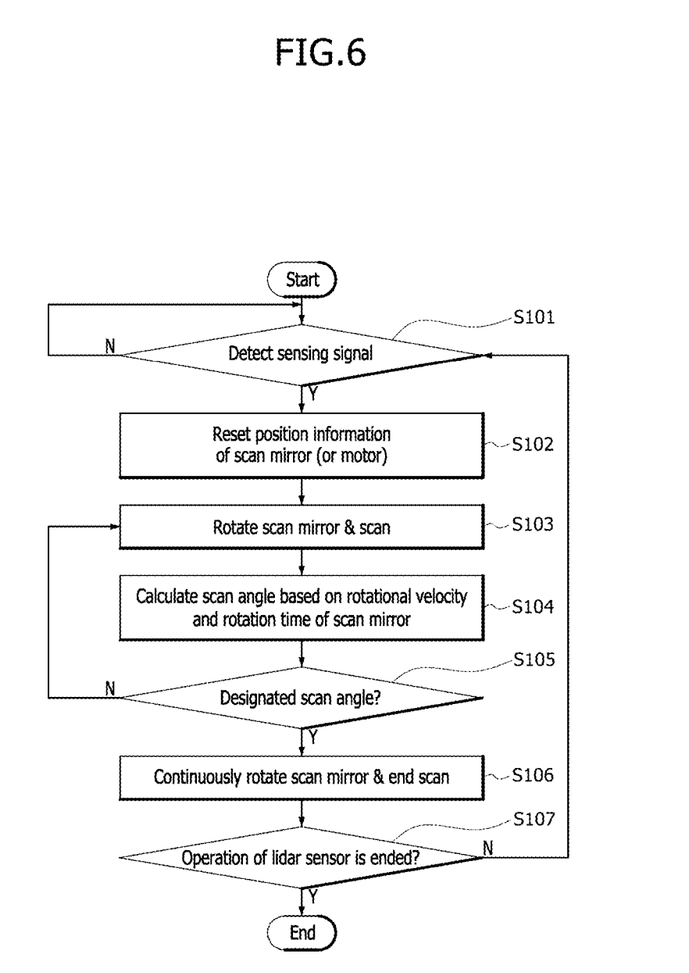
FIG. 6 is a flowchart illustrating an operating method of a mirror-rotating lidar sensor in accordance with an embodiment of the present invention.

FIG. 6 is a flowchart illustrating an operating method of a mirror-rotating lidar sensor in accordance with an embodiment of the present invention.

Referring to FIG. 6, the control unit 230 may check whether a sensing signal of the hall sensor is detected, at step S101.

When the sensing signal of the hall sensor is detected (Y at step S101), the control unit 230 may reset the position information of the scan mirror or the driving motor at step S102. For example, the control unit 230 may set a rotation angle to 0 degrees corresponding to the reference position.

That is, when the sensing signal of the hall sensor is detected, the control unit 230 may determine that the scan mirror or the driving motor is at the reference position (for example, the start position of the scan region).

The control unit 230 may perform laser scan while rotating the scan mirror or the driving motor at a designated velocity, at step S103.

For example, when the reference position is set to the start position of the scan region, the control unit 230 may immediately start laser scan. On the other hand, when the reference position is set to another position which does not correspond to the start position of the scan region, the control unit 230 may start laser scan at the start position of the scan region, calculated from the reference position.

Furthermore, the control unit 230 may calculate the angle (or scan angle) at which the driving motor 202 or the rotating mirror (or scan mirror) 201 is rotated, based on the rotational velocity and time from the reference position where the rotation angle is set to 0 degrees, at step S104.

The control unit 230 may check whether the calculated angle has become a designated scan angle, i.e. an angle corresponding to the end position of the scan region, at step S105.

Until the calculated angle becomes the designated scan angle corresponding to the end position of the scan region (N at step S105), the control unit 230 may continuously perform laser scan and calculate a scan angle, while turning the scan mirror or the driving motor at the designated velocity, at steps S103 to S105.

Then, when the calculated angle becomes the designated scan angle corresponding to the end position of the scan region (Y at step S105), the control unit 230 may determine that the current region is the non-scan region, continuously rotate the scan mirror 201, and end the laser scan, at step S106.

That is, the scan region and the non-scan region may be repeated while the lidar sensor rotates the scan mirror 201 at 360 degrees. Thus, in the non-scan region, the control unit 230 may continuously rotate the scan mirror 201, but not perform laser scan.

The process in which the control unit 230 calculates the scan region and the non-scan region from the reference position and repeatedly starts and ends the laser scan may be repeated until the operation of the lidar sensor is ended, at step S107. At this time, the control unit 230 may calculate the rotation angle based on the time and the rotational velocity of the motor, and calculate the scan region and the non-scan region based on the rotation angle.

As described above, the present embodiment can reduce the size of the lidar sensor through the structure change of the driving unit including the rotating mirror (or scan mirror) and the driving motor to rotate the rotating mirror, and provide the rotation detection method of the rotating mirror, which is suitable for the structure of the driving unit.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A lidar sensor comprising:
    a driving motor, an entire portion of the driving motor covered under an inclined surface of a scan mirror having an opened bottom surface and an A-shaped cross-section, wherein a rotating shaft of the driving motor is connected to a bottom of a backing surface disposed under the inclined surface;
    a magnet disposed at a bottom of one or more of the backing surface and a support surface which are connected to the inclined surface of the scan mirror; and
    a hall sensor disposed at a bottom surface of the lidar sensor in a location corresponding to a position of the magnet.

2. The lidar sensor of claim 1, wherein the inclined surface of the scan mirror is inclined with respect to the bottom surface of the lidar sensor,
    one side of the backing surface is horizontally connected to a bottom of the inclined surface,
    the support surface is connected to a top of the inclined surface and another side of the backing surface at a designated angle, and
    the inclined surface, the backing surface, and the support surface form the A-shaped cross-section.

3. The lidar sensor of claim 2, wherein the backing surface is disposed at a height into which a height including a height of a main body of the driving motor and a length of the rotating shaft is reflected.

4. The lidar sensor of claim 3, wherein the backing surface is disposed at a height corresponding to a designated gap, such that the opened bottom surface of the scan mirror does not come in contact with the bottom surface of the lidar sensor having the driving motor attached thereto, when the driving motor is connected to the backing surface.

5. The lidar sensor of claim 1, further comprising:
    a motor driving unit configured to rotate the scan mirror connected to the driving motor at a designated velocity; and
    a control unit configured to calculate an angle at which the driving motor or scan mirror is rotated, based on a rotational velocity and time from a reference position where the magnet is attached, and to control an output of laser by distinguishing between a scan region and a non- scan region based on the calculated angle.

6. The lidar sensor of claim 5, wherein the control unit is configured to scan an object ahead of the lidar sensor by outputting a laser scan signal, when the calculated angle corresponds to the scan region, and the control unit is configured to not output the laser scan signal when the calculated angle corresponds to the non-scan region.

7. A control method of a lidar sensor, comprising the steps of:
    detecting, by a control unit of the lidar sensor, a sensing signal indicating a reference position of a scan mirror;
    resetting, by the control unit, a current position information to the reference position, when the sensing signal is detected;
    performing, by the control unit, a laser scan while rotating the scan mirror at a designated velocity;

calculating, by the control unit, an angle at which the scan mirror is rotated, based on a rotational velocity and time from the reference position;

checking, by the control unit, whether the calculated angle reaches a designated scan angle;

continuously performing, by the control unit, the laser scan and the step for calculating the scan angle, while rotating the scan mirror at a designated velocity, until the calculated angle reaches the designated scan angle; and performing, by the control unit, the laser scan in a scan region, and ending the laser scan in a non-scan region, based on the calculated scan angle.

8. The control method of claim 7, wherein the sensing signal comprises a signal obtained when a hall sensor senses a magnet formed at one surface of a bottom of the scan mirror.

9. The control method of claim 7, wherein the reference position is set to a start position of the scan region, and wherein when the sensing signal indicating the reference position is detected, the control unit immediately starts the laser scan.

10. The control method of claim 7, wherein the reference position is set to a position different from a start position of the scan region, wherein when the sensing signal indicating the reference position is detected, the control unit is configured to calculate the start position of the scan region from the reference position, and to start the laser scan at the calculated start position of the scan region.

11. The control method of claim 7, wherein the designated scan angle comprises one or more of an angle corresponding to a start position of the scan region and an angle corresponding to an end position of the scan region.

* * * * *